US006775126B2

(12) United States Patent
Fujii et al.

(10) Patent No.: US 6,775,126 B2
(45) Date of Patent: Aug. 10, 2004

(54) SOLID ELECTROLYTIC CAPACITOR AND METHOD OF MANUFACTURING CAPACITOR

(75) Inventors: Tatsuo Fujii, Osaka (JP); Katsumasa Miki, Osaka (JP); Yuji Mido, Osaka (JP); Suzushi Kimura, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/691,239

(22) Filed: Oct. 22, 2003

(65) Prior Publication Data

US 2004/0130856 A1 Jul. 8, 2004

(30) Foreign Application Priority Data

Oct. 25, 2002 (JP) ....................................... 2002-310758

(51) Int. Cl.[7] ................................................. H01G 9/04

(52) U.S. Cl. ....................... 361/523; 361/508; 361/509; 361/516; 361/525; 361/528; 29/25.03

(58) Field of Search ................................ 361/523, 502, 361/504, 508, 509, 516, 517, 520, 525, 528, 530, 532, 519; 24/25.03

(56) References Cited

U.S. PATENT DOCUMENTS 5,005,107 A * 4/1991 Kobashi et al. ............. 361/540
5,189,770 A * 3/1993 Waidhas et al. ........... 29/25.03
6,310,765 B1 * 10/2001 Tanahashi et al. .......... 361/516
6,400,554 B1 * 6/2002 Shiraishi et al. ........... 361/508
6,466,430 B2 * 10/2002 Mido et al. ................. 361/529
6,473,293 B2 * 10/2002 Shimada et al. ............ 361/523

FOREIGN PATENT DOCUMENTS

JP 2000-243665 9/2000

* cited by examiner

*Primary Examiner*—Dean A. Reichard
*Assistant Examiner*—Nguyen T. Ha
(74) *Attorney, Agent, or Firm*—RatnerPrestia

(57) ABSTRACT

A dielectric layer is formed on a surface of a porous portion formed at least on a surface of a valve metal sheet. A solid electrolyte layer is formed on the dielectric layer, and a collector layer is formed on the solid electrolyte layer. A first insulating portion is formed on an outer periphery of the dielectric layer, and a solid electrolyte layer is formed on a portion of the dielectric layer corresponding to an opening of the first insulating portion. A portion of the solid electrolyte layer is formed on the first insulating portion. A second insulating portion is formed on the first insulating portion and on the outer periphery of the solid electrolyte layer. A collector layer is formed on a surface of the solid electrolyte layer exposed through an opening of the second insulating portion, thus providing a solid electrolytic capacitor. The solid electrolytic capacitor has less current leakage and a high withstand voltage.

38 Claims, 6 Drawing Sheets

5
4
3
6
2
101
1

SOLID ELECTROLYTIC CAPACITOR AND METHOD OF MANUFACTURING CAPACITOR

FIELD OF THE INVENTION

The present invention relates to a solid electrolytic capacitor used in various electronic devices, and to a method of manufacturing the capacitor.

BACKGROUND OF THE INVENTION

FIG. 11 is a sectional view of a conventional solid electrolytic capacitor disclosed in Japanese Patent Laid-Open Publication No.2000-243665. One side or a middle core portion in a thickness direction of porous valve metal sheet 20 made of metal, such as aluminum and tantalum, is used as an electrode. Dielectric layer 21 is provided on a surface of a porous portion of the valve metal sheet 20. Solid electrolyte layer 22 formed of a conductive polymer layer is provided on the dielectric layer 21. Collector layer 23 is provided on the solid electrolyte layer 22. An electrode layer made of metal is provided on the collector layer 23.

When the solid electrolyte layer 22 is formed in this solid electrolytic capacitor, conductive polymer is formed at electrode lead-out portion 24 of the valve metal sheet 20, thus causing a short-circuit or a current leaking. In order to prevent such trouble, the electrode lead-out portion 24 is separated from the solid electrolyte layer 22 with insulating separator 25 made of insulating resin provided at the electrode lead-out portion 24.

The insulating separator 25 is generally formed by applying and hardening insulating resin, such as epoxy resin and silicone resin, or by affixing an insulating tape including polyamide as a base material. The solid electrolyte layer 22 becomes partially defective on the dielectric layer 21 close to the boundary between the dielectric layer 21 and the insulating separator 25, and this may cause a short-circuiting or a current leaking.

When insulating resin is applied, the resin is sucked into the porous portions of the valve metal sheet 20, and thus, the capacitor becomes unable to control its electrostatic capacity, losing its characteristics as a capacitor. Further, the application of insulating resin influences workability and mass-productivity in a manufacturing of the capacitor.

SUMMARY OF THE INVENTION

A solid electrolytic capacitor includes a valve metal sheet having a porous portion on a first surface of the sheet, a dielectric layer provided on the porous portion, a first insulating portion provided on an outer periphery of the dielectric layer, a solid electrolyte layer provided on the dielectric layer, a second insulating portion provided on an outer periphery of the solid electrolyte layer and on the first insulating portion, and a collector layer provided on the solid electrolyte layer.

The solid electrolytic capacitor causes less current leakage and assures a high withstand voltage.

DESCRIPTION OF THE PREFERRED EMBODIMENT

Exemplary Embodiment 1

Figure 1:
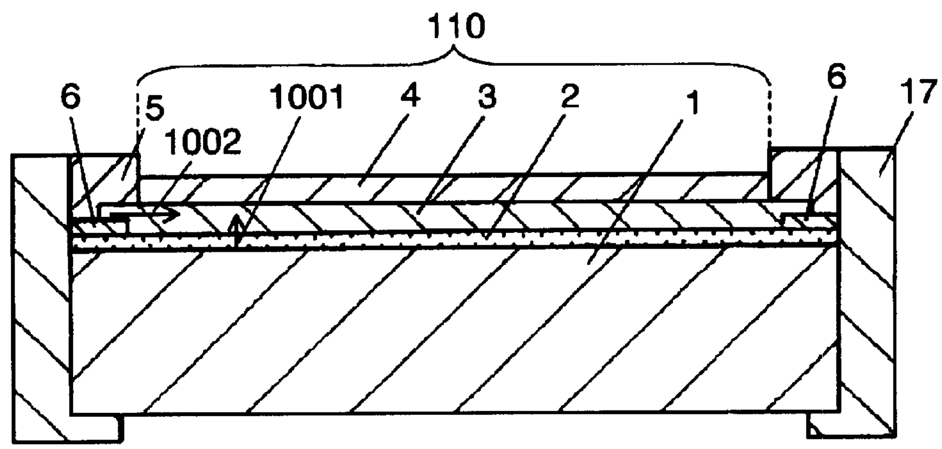
FIG. 1 is a sectional view of a solid electrolytic capacitor according to Exemplary Embodiments 1 and 2 of the present invention.
Figure 2:
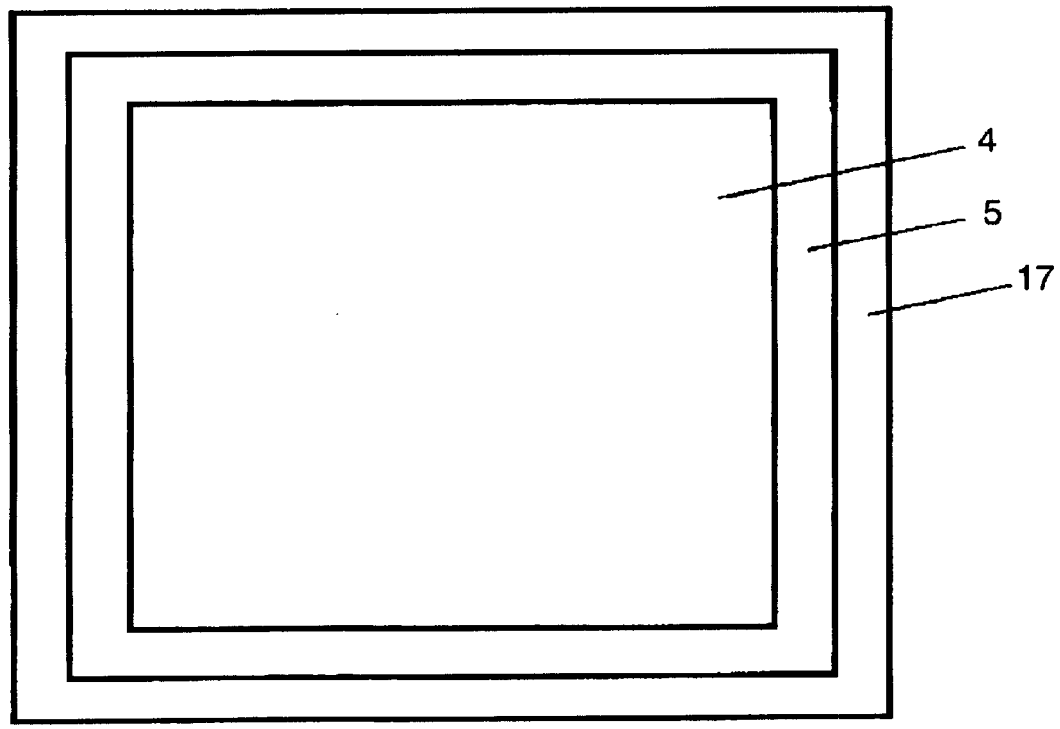
FIG. 2 is a top view of the solid electrolytic capacitor according to Embodiments 1 and 2.
Figure 3:
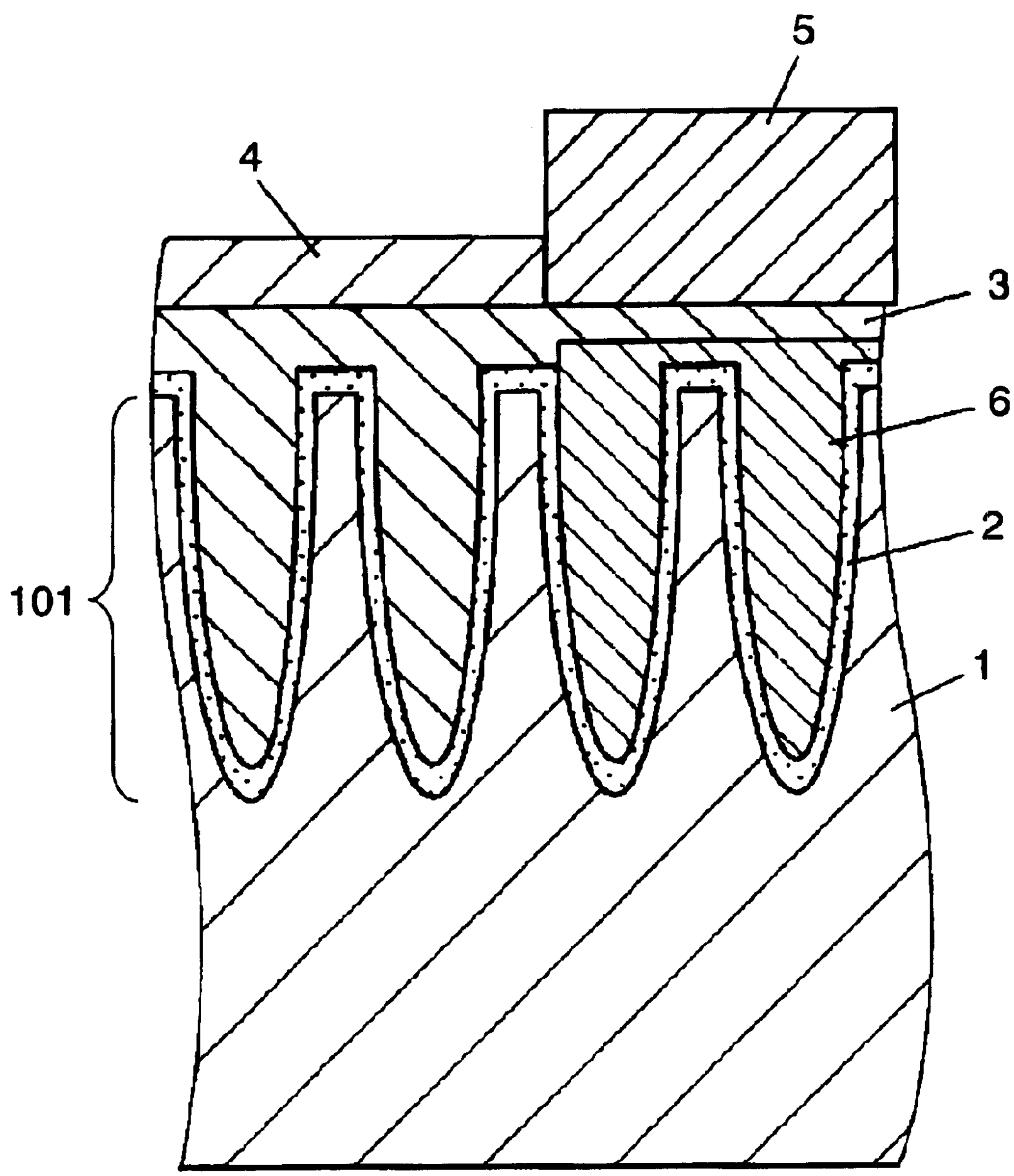
FIG. 3 is an enlarged sectional view of the solid electrolytic capacitor according to Embodiments 1.

FIG. 1 is a sectional view of a solid electrolytic capacitor according to Exemplary Embodiment 1 of the present invention. FIGS. 2 and 3 are a top view and an enlarged sectional view of the capacitor, respectively. These figures show the capacitor just schematically, thus not showing correct dimensions of each element. Dielectric layer 2 is formed on a surface of porous portion 101 provided at least on a side of valve metal sheet 1. Solid electrolyte layer 3 is formed on the dielectric layer 2, and collector layer 4 is formed on the solid electrolyte layer 3, thus providing the capacitance element of the solid electrolytic capacitor. The capacitance element is a basic element for the capacitor to function as a capacitor. Insulating portion 6 is provided on an outer periphery of the dielectric layer 2, and solid electrolyte layer 3 is provided on a surface of the dielectric layer 2 exposed from the insulating portion 6. A part of the solid electrolyte layer 3 is formed on the insulating portion 6. Insulating portion 5 having opening 110 is provided on the insulating portion 6 and an outer periphery of the solid electrolyte layer 3. The collector layer 4 is formed on a surface of the solid electrolyte layer 3 exposed from the opening 110 of the insulating portion 6.

The insulating portion 6 regulates the overlap area of the dielectric layer 2 and the solid electrolyte layer 3, i.e., an area for providing a capacitance, thus reducing a variation of the capacitance of the capacitor.

This structure prevents declining of a capacitance characteristics at high frequencies. An electrical charge stored in the dielectric layer 2 often passes through the solid electrolyte layer 3 in a thickness direction 1001, and is discharged rapidly through the collector layer 4 having a large conductivity. In a capacitor not having particularly insulating portion 6, an electrical charge stored in the capacitance element moves in the solid electrolyte layer 3 in a direction 1002 parallel to the layer to reach the collector layer 4. The solid electrolyte layer 3 has a resistance larger than that of the collector layer 4, thus preventing the electrical charge from moving in the direction 1002 at the high frequencies higher than 10 kHz and decreasing the capacitance. The capacitor including the insulating portion 6 has excellent high frequency characteristics since the portion 6 prevents a capacitance from being taken from under the insulating portion 5 of the dielectric layer 2.

The valve metal sheet 1 may employ aluminum foil having porous portion 101 formed by etching a surface of the foil. The aluminum foil is used for an aluminum electrolytic capacitor. Therefore, the capacitor of Embodiment 1 can be manufactured at high productivity.

Figure 10:
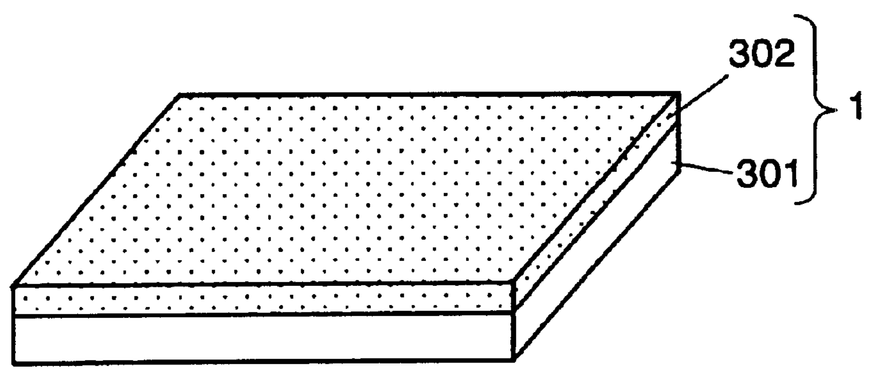
FIG. 10 shows another valve metal sheet of the solid electrolytic capacitor according to Embodiment 1.
Figure 11:
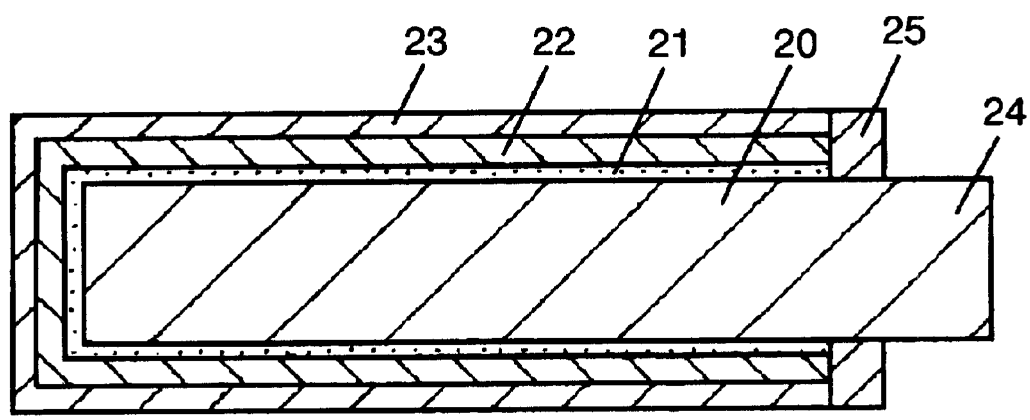
FIG. 11 is a sectional view of a conventional solid electrolytic capacitor.

As shown in FIG. 10, the valve metal sheet 1 may preferably includes valve metal foil 301 made of metal, such as tantalum and niobium, and sintered body 302 provided by sintering valve metal powder on a surface of the foil 301. This structure allows the capacitor to have an electrostatic capacitance larger than that of a capacitor including the aluminum foil as the valve metal body 1.

The configuration of the solid electrolytic capacitor of Embodiment 1 will be described in detail. In FIGS. 1 to 3, the dielectric layer 2 is formed on the surface and surfaces of pores by anodizing the valve metal sheet 1. The solid electrolyte layer 3 formed on the dielectric layer 2 is a layer of functional polymer, such as polypyrrole and polythiophene, formed by chemical or electrolytic polymerization. The solid electrolyte layer 3 may preferably be a layer of manganese dioxide formed by impregnation and thermal decomposition of manganese nitrate. The collector layer 4 formed on the solid electrolyte layer 3 can be formed by applying a conductive paste.

A method of manufacturing the solid electrolytic capacitor of Embodiment 1 will be described.

First, aluminum foil having porous portion 101 formed by etching a surface of the foil is prepared as the valve metal sheet 1. The aluminum foil can be easily obtained by masking and etching the surface of the foil.

Next, the dielectric layer 2 is formed on the porous portion 101 of the valve metal sheet 1. The dielectric layer 2 can be formed on a side of the sheet 1 by masking the valve metal sheet 1 and anodizing the sheet 1 in anodizing solution.

Then, insulating resin is applied to an outer periphery of the dielectric layer 2 to form the insulating portion 6 is formed. The insulating resin, having a viscosity more than 1 Pa·s, does not flow during the application, thus reducing the variation of the capacitance of the capacitor. The resin may be applied by a dispenser, thus enhancing workability and mass-productivity in manufacturing of the capacitor.

The insulating resin for the insulating portion 6 may preferably have a hydrophilic property. A polymer layer hardly grows on a water-repellent resin, while the polymer layer easily grows on a hydrophilic resin. Therefore, a solid electrolyte layer of conductive polymer formed by polymerization for an area from the dielectric layer 2 to the insulating portion 6 has a uniform thickness, thus providing a solid electrolytic capacitor having less short-circuiting. The insulating resin for the insulating portion 6 may employ epoxy resin.

Next, the solid electrolyte layer 3 is formed on a surface of the dielectric layer 2 exposed through the opening of the insulating portion 6. The solid electrolyte layer 3 can be formed through providing a composite including pi-electron conjugated polymer, such as polypyrrole and polythiophene, and/or other conductive polymer on the dielectric layer 2 by insulating chemical polymerization, electrolytic polymerization, or their combination. The solid electrolyte layer 3 may be provided by executing electrolytic polymerization of conductive polymer after applying and drying suspension of conductive polymer powder. The solid electrolyte layer 3 may be provided by executing electrolytic polymerization of conductive polymer after impregnation of manganese nitrate and thermal decomposition to form manganese dioxide. Further, the solid electrolyte layer 3 may be provided by using manganese dioxide obtained by thermal decomposition of manganese nitrate, and this method enables the thickness of the layer 3 to be controlled, thus providing fine solid electrolyte layer 3 and improving productivity and reliability of the capacitor.

Then, the insulating portion 5 is formed by applying insulating resin on an outer periphery of the solid electrolyte layer 3. The insulating resin, having a viscosity more than 1 pa·s does not flow during the application, thus reducing variation of a capacitance of the capacitor. The insulating resin can be easily applied by a dispenser at high productivity.

Next, the collector layer 4 is formed on a surface of the solid electrolyte layer 3 exposed through an opening of the insulating portion 5. The collector layer 4 includes a carbon layer and a silver paste layer which are stacked, and the carbon layer and the silver layer are formed with suspension of fine carbon particles and conductive adhesive based on silver paste, respectively, thus taking out an electrical charge. The collector layer 4 may be formed by evaporation or plating. For example, the collector layer 4 may have a low contact resistance if being formed by plating silver directly on the solid electrolyte layer 3 of thiophene without the carbon layer between the silver layer and the layer 3.

The above processes provide the solid electrolytic capacitor of Embodiment 1. If reliability and mechanical strength are required to improve, outer jacket 17 may preferably provided around the solid electrolytic capacitor.

The above method provides the solid electrolytic capacitor including the collector layer 4 which is not provided on the dielectric layer 2, thus reducing a possibility of the short-circuiting.

A method of forming the solid electrolyte layer 3 providing higher reliability with less fear of the short-circuiting will be described.

First, a conductive polymer layer is formed by chemical polymerization on the surface of the dielectric layer 2 exposed through the opening of insulating portion 6 and on the insulating portion 6 around the opening of the insulating portion 6.

Next, a feed electrode is connected to a portion of the conductive polymer layer positioned on the insulating portion. Thereby, another conductive polymer layer is formed by electrolytic polymerization at a portion of the conductive polymer layer on the surface of the dielectric layer 2 exposed through the opening of the insulating portion 6 and at a portion of the conductive polymer layer around the opening of the insulating portion 6. Thus, a conductive polymer layer can be formed at the boundary between the dielectric layer 2 and the insulating portion 6, thus reducing a possibility of short-circuiting for the solid electrolytic capacitor.

The insulating portion 6 reduces the variation of a capacitance by regulating the area for providing the capacitance. The insulating portion 6 prevents a capacitance from being taken from a portion of the dielectric layer 2 under the insulating portion 5, thus providing a solid electrolytic capacitor having a capacitance decreasing at high frequencies.

Exemplary Embodiment 2

Figure 4:
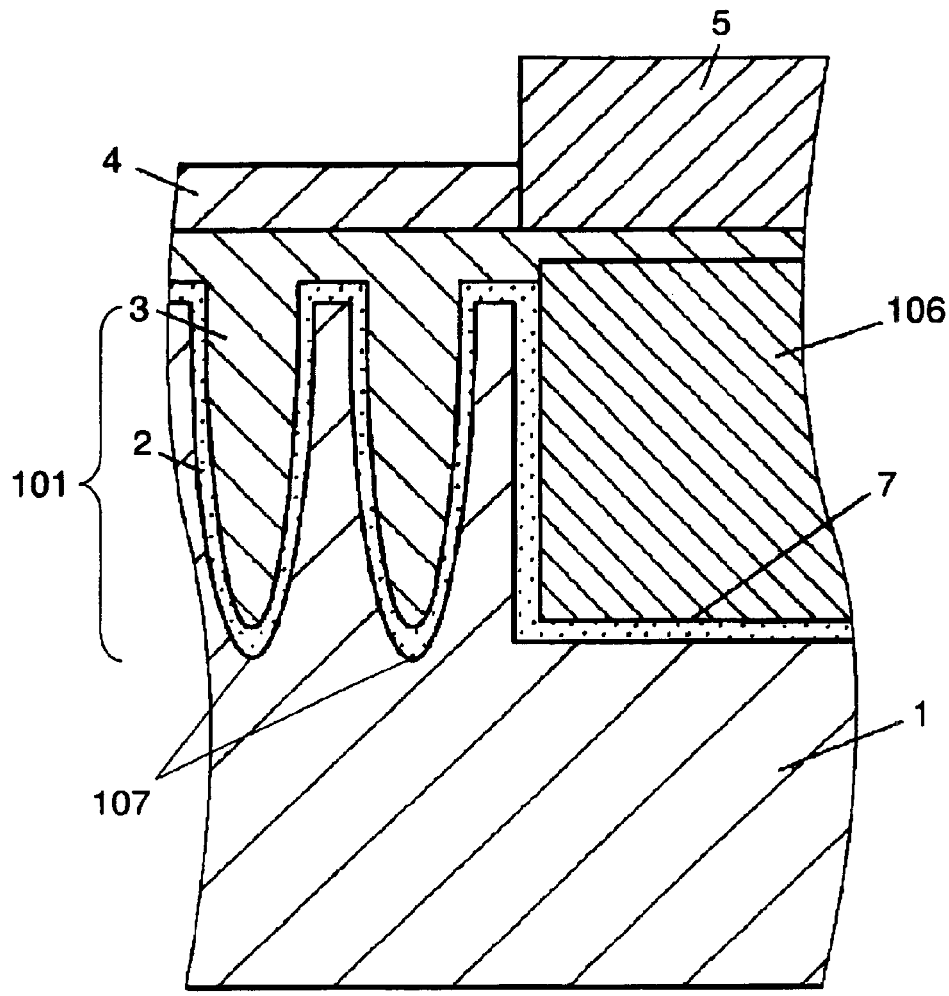
FIG. 4 is an enlarged sectional view of the solid electrolytic capacitor according to Embodiments 2.

FIG. 1 is a sectional view of a solid electrolytic capacitor according to Exemplary Embodiment 2 of the present invention. FIGS. 2 and 4 are a top view and an enlarged sectional view of the capacitor, respectively. These figures show the capacitor just schematically, thus not showing correct dimensions of each element. Dielectric layer 2 is formed on a surface of porous portion 101 provided at least on a side of valve metal sheet 1, and solid electrolyte layer 3 is formed on the dielectric layer 2. Collector layer 4 is formed on the solid electrolyte layer 3. The valve metal sheet 1, dielectric layer 2, solid electrolyte layer 3, and collector layer 4 forms a capacitance element.

In the capacitor of Embodiment 2, recess 7 is formed in an outer periphery of the valve metal sheet 1, and insulating portion 106 is provided at least on the recess 7. The solid electrolyte layer 3 is provided on a surface of the dielectric layer 2 exposed through an opening surrounded by an inner periphery of the insulating portion 106. Insulating portion 5 is provided on the insulating portion 106 and on an outer periphery of the solid electrolyte layer 3. The collector layer 4 is provided on a surface of the solid electrolyte layer 3 exposed through an opening surrounded by an inner periphery of the insulating portion 5.

The solid electrolytic capacitor of Embodiment 2, differently from a capacitor of Embodiment 1, is provided with the recess 7 formed in the outer periphery of the valve metal sheet 1. In the capacitor of Embodiment 1, the insulating portion 6 is formed on an outer periphery of dielectric layer 2 in order to prevent a capacitance from being taken from an outer periphery of the valve metal sheet 1. However, if pit 107 of porous portion 101 of the valve metal sheet 1 has a diameter less than 10 μm and a depth more than 20 μm, the pit 107 is hardly filled with the insulating portion 6.

The recess 7 provided at a portion corresponding to the insulating portion 106 of the valve metal sheet 1 is filled with insulating resin to form the insulating portion 106. This arrangement reduces variation of a capacitance of the capacitor caused due to a capacitance taken from the porous portion 101, thus preventing capacitance characteristics of the capacitor from declining at high frequencies.

A method of manufacturing the solid electrolytic capacitor of Embodiment 2 will be described. The valve metal sheet 1 may employ aluminum foil having porous portion 101 formed on a surface of the foil.

Next, similarly to Embodiment 1, dielectric layer 2 is formed by anodizing a surface of the porous portion 101 of the valve metal sheet 1 with anodizing solution.

Then, the recess 7 is formed at the outer periphery of the valve metal sheet 1. The recess 7 may be formed by pressing, grinding, chemical etching, or laser beam machining process with high productivity.

Insulating portion 106 is formed on the recess 7 by filling the recess with insulating resin similarly to Embodiment 1.

Then, the solid electrolytic capacitor is manufactured similarly to Embodiment 1.

Exemplary Embodiment 3

Figure 5:
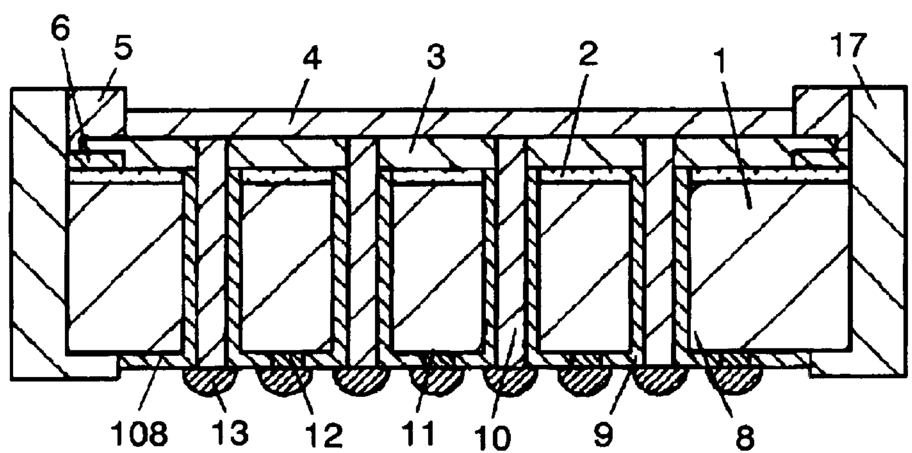
FIG. 5 is a sectional view of a solid electrolytic capacitor according to Exemplary Embodiment 3 of the invention.
Figure 6:
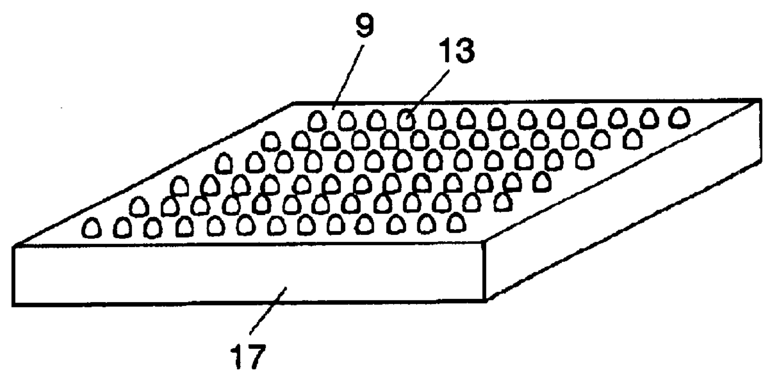
FIG. 6 is a perspective view of the solid electrolytic capacitor according to Embodiment 3.
Figure 7:
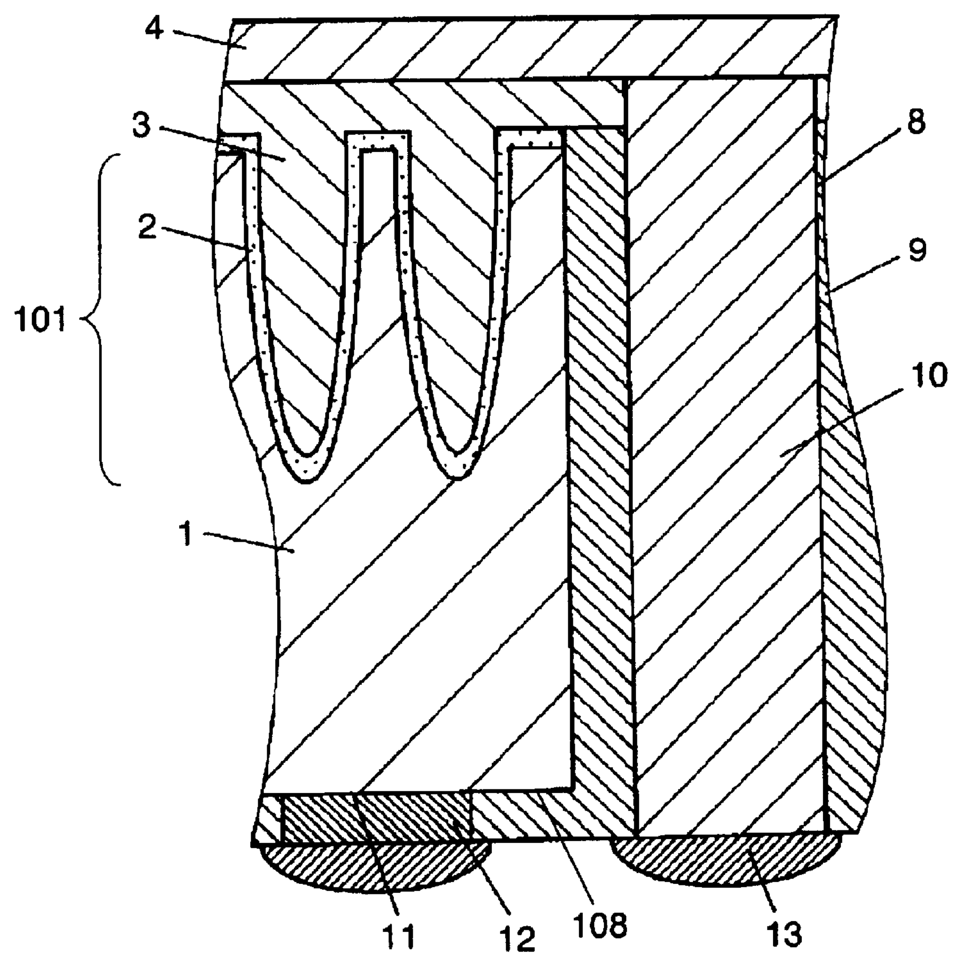
FIG. 7 is an enlarged sectional view of the solid electrolytic capacitor according to Embodiment 3.

FIG. 5 is a sectional view of a solid electrolytic capacitor according to Exemplary Embodiment 3 of the present invention. FIGS. 6 and 7 are a perspective view and an enlarged sectional view of the capacitor, respectively. Dielectric layer 2 is formed on a surface of porous portion 101 provided at least on a side of valve metal sheet 1, and solid electrolyte layer 3 is formed on the dielectric layer 2. Collector layer 4 is formed on the solid electrolyte layer 3. The valve metal sheet 1, dielectric layer 2, solid electrolyte layer 3, and collector layer 4 forms a capacitance element.

In the capacitor of Embodiment 3, plural through-holes 8 are provided in the valve metal sheet 1. Insulating portion 9 of insulating material is formed by electro-deposition or the like on an inner wall of through-hole 8 and on a surface 108 of valve metal sheet 1 on which the porous portion 101 is not formed. Through-hole electrodes 10 are provided in the through-holes 8 with conductive adhesive or by plating process, respectively, and the through-hole electrodes 10 are connected to the collector layer 4. Opening 11 is formed at a predetermined position of the insulating portion 9. Connection terminal 12 is provided in the opening 11 with conductive material, and connection bumps 13 are provided on the connection terminal 12 and the through-hole electrode 10 in order to connect an external device, such as a semiconductor or a passive element, easily to the electrode and the terminal.

The capacitor of Embodiment 3 can be connected directly to the external device via the connection bump 13. The capacitor has a small size and excellent characteristics at high frequencies and can be mounted on the external device densely and assure excellent productivity.

The through-hole electrodes 10 may be arranged in such manner that magnetic fields generated by currents flowing in the electrodes 10 are cancelled each other. This arrangement reduces a reactance component of the solid electrolytic capacitor. The solid electrolytic capacitor of Embodiment 3 has a stable capacitance and reduces a short-circuiting 16 similarly to the capacitors of Embodiments 1 and 2.

A method of manufacturing the solid electrolytic capacitor of Embodiment 3 will be described.

First, valve metal sheet 1 is prepared. The sheet may emply aluminum foil having porous portion 101 formed by etching a surface of the foil.

Next, dielectric layer 2 is formed on a surface of porous portion 101 of the valve metal sheet 1. The dielectric layer 2 is formed by anodizing the valve metal sheet 1 having a surface masked in anodizing solution.

Then, recess 7 is formed in the outer periphery of the valve metal sheet 1, and insulating portion 106 is formed in the recess 7 simialrly to Embodiment 2. In the capacitor of Embodiment 3, insulating portion 6 of Embodiment 1 shown in FIG. 3 is placed by the insulating portion 106 formed in the recess 7.

Then, the through-holes 8 are formed in the predetermined positions of the valve metal sheet 1 by a laser beam machining process, punching process, drilling process, or discharging process. The through-holes 8 may be formed inexpensively by a proper method determined according to diameters and the number of the through-holes 8.

Next, insulating portion 9 is formed on an inner wall of through-hole 8 and on surface 108 of the valve metal sheet 1 on which the porous portion 101 is not formed. The insulating portion 9 may be made thin easily by masking the dielectric layer 2 with a resist and by then electrically depositing insulating resin on the valve metal sheet 1.

Then, a layer of a composite including pi-electron conjugated polymer, such as polypyrrole and polythiophene, and/or other conductive polymer is formed on the dielectric layer 2 by chemical polymerization, electrolytic polymerization or their combination, thus providing the solid electrolyte layer 3.

Next, similarly to Embodiment 1, insulating portion 5 is formed on the outer periphery of the solid electrolyte layer 3. Then, collector layer 4 is formed on a surface of the solid electrolyte layer 3 exposed through an opening surrounded by an inner periphery of the insulating portion 5.

Then, through-hole electrodes 10 connected to the collector layer 4 is formed in the through-holes 8. The through-hole electrode 10 may be preferably formed simultaneously to forming of the collector layer 4. While silver paste is applied to form the collector layer 4, the through-hole electrodes 10 may be simultaneously formed by hardening the silver paste filled into the through-holes 8.

Then, opening 11 is formed in a predetermined position of the insulating portion 9 by YAG laser beam machining process or the like. The opening 11 may be formed by the following method. Before forming of the insulating portion 9, a resist of photoresist resin or the like is applied at the predetermined position of the surface 108 of the valve metal sheet 1 on which the porous portion 101 is not formed, and then, the resist is removed after the forming of the insulating portion 9.

Connection terminal 12 is formed on a surface exposed from the opening 11 of the valve metal sheet 1 by applying conductive adhesive, electroplating process or non-electrolytic plating process.

The above processes provide the solid electrolytic capacitor of Embodiment 3. However, when reliability of connection with an external device, such as a semiconductor or an electronic element as well as electrical performance of the connection, the connection bump 13 may be preferably formed on the connection terminal 12.

The above method provides a solid electrolytic capacitor capable of being connected directly to the external device and having excellent characteristics at high frequencies and a small reactance component.

Exemplary Embodiment 4

Figure 8:
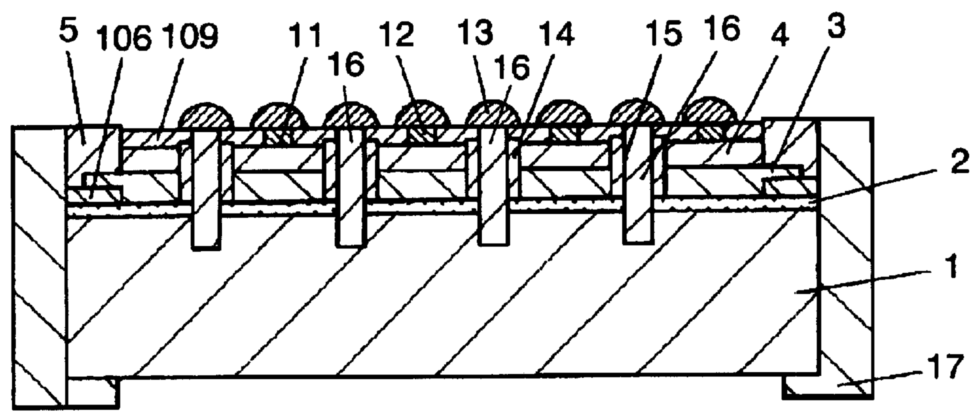
FIG. 8 is a sectional view of a solid electrolytic capacitor according to Exemplary Embodiment 4 of the invention.
Figure 9:
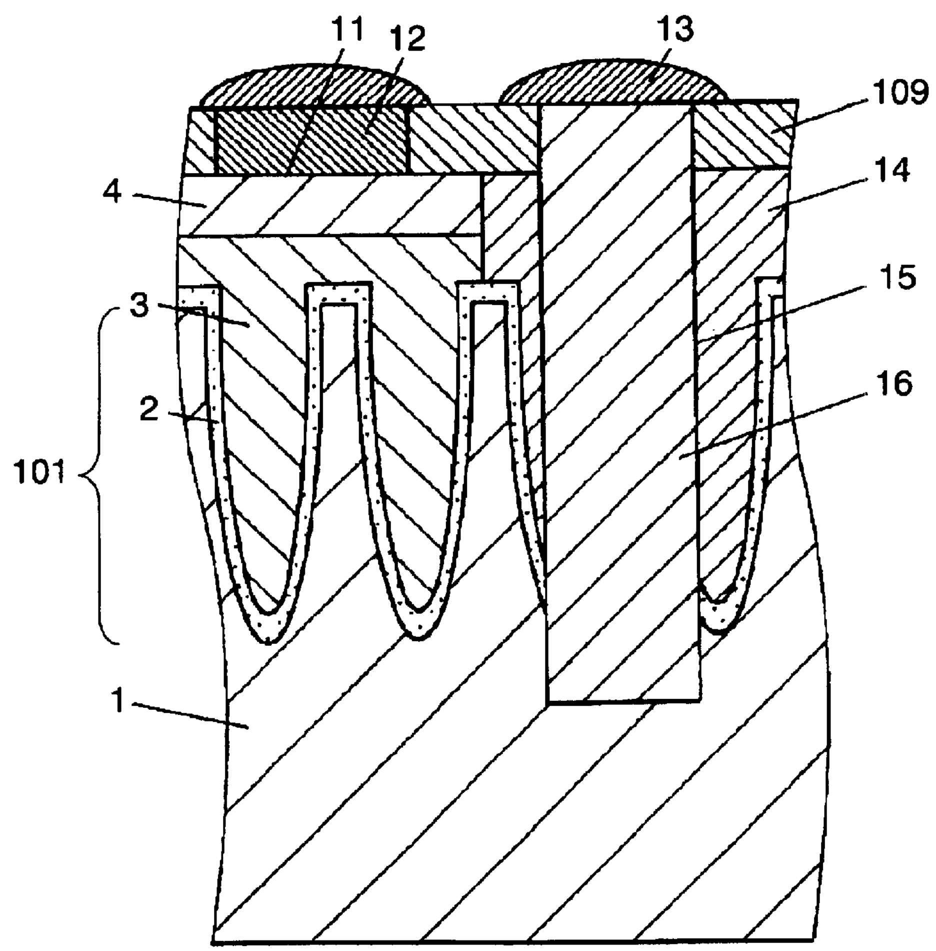
FIG. 9 is an enlarged sectional view of the solid electrolytic capacitor according to Embodiment 4.

FIG. 8 is a sectional view of a solid electrolytic capacitor according to Exemplary Embodiment 4 of the present invention. FIGS. 6 and 9 are a perspective view and an enlarged sectional view of the capacitor, respectively. These figures show the capacitor just schematically, thus not showing correct dimensions of the capacitor.

Dielectric layer 2 is formed on a surface of porous portion 101 provided at least on a surface of valve metal sheet 1. Solid electrolyte layer 3 is formed on dielectric layer 2, and collector layer 4 is formed on the solid electrolyte layer 3. The valve metal sheet 1, dielectric layer 2, solid electrolyte layer 3, and collector layer 4 forms a capacitance element of the solid electrolytic capacitor. Plural insulating portions 14 is provided through the solid electrolyte layer 3 and the collector layer 4. Insulating portion 109 is provided on the collector layer 4 and the insulating portions 14. Plural via-holes 15 reaching the valve metal sheet 1 are formed in the insulating portion 14. Plural via-hole electrodes 16 connected to the valve metal sheet 1 are provided in respective ones of the via-holes 15. Opening 11 is formed in insulating portion 109, and connection terminal 12 is formed in the opening 11. Connection bumps 13 are provided on the connection terminal 12 and the via-hole electrode 16.

The capacitor of Embodiment 4 can be connected directly and electrically to an external device via the connection bumps 13. The capacitor has a small size and excellent characteristics at high frequencies, and can be mounted on the external device densely and assure high productivity.

The plural via-hole electrodes 16 are arranged in such manner that magnetic fields generated by currents flowing in the electrodes, thus reducing a reactance component of the solid electrolytic capacitor. The solid electrolytic capacitor of Embodiment 4 has a stable capacitance and less possibility of short-circuiting similarly to capacitors of Embodiments 1 to 3.

Next, a method of manufacturing the solid electrolytic capacitor of Embodiment 4 will be described.

The valve metal sheet 1 may employ aluminum foil having the porous portion 101 formed by etching a surface of the foil. Next, the dielectric layer 2 is formed on a surface of porous portion 101 of the valve metal sheet 1. The dielectric layer 2 can be formed by anodizing the valve metal sheet 1 in anodizing solution.

Recess 7 is formed in an outer periphery of the valve metal sheet 1, and insulating portion 106 is then formed in the recess 7 similarly to Embodiment 2. In the capacitor of Embodiment 4, insulating portion 6 of Embodiment 1 shown in FIG. 3 is replaced by the insulating portion 106 provided in the recess 7.

Then, insulating portion 14 is formed on the dielectric layer 2. The insulating portion 14 can be formed by potting insulating resin or patterning photosensitive resin and the like. The insulating portion 14 is required to be thicker than the total thickness of the solid electrolyte layer 3 and the collector layer 4 so that the portion 14 may be provided through the solid electrolyte layer 3 and the collector layer 4 formed in later processes.

Then, solid electrolyte layer 3 is formed on the dielectric layer 2. A layer of composite including pi-electron conjugated polymer, such as polypyrrole and polythiophene, and/or other conductive polymer is formed on the dielectric layer 2 by chemical polymerization, electrolytic polymerization or their combination, thus providing the solid electrolyte layer 3 Insulating portion 5 is formed on the outer periphery of the solid electrolyte layer 3. The collector layer 4 is formed on a surface of the solid electrolyte layer 3 exposed through an opening surrounded by an inner periphery of the insulating portion 5.

Next, insulating portion 109 can be easily formed on the collector layer 4 and the insulating portion 14 by printing insulating resin.

Then, via-hole 15 reaching the valve metal sheet 1 is formed in the insulating portion 14 by laser beam machining process, punching process, drilling process, or discharging process.

Via-hole electrode 16 connected to the valve metal sheet 1 is formed in the via-hole 15. The via-hole electrode 16 can be formed by filling and hardening conductive paste in the via-hole 15. The electrode 16 may be formed by a plating process.

Next, opening 11 is formed in a predetermined position of insulating portion 109 by YAG laser beam machining process or the like. The opening 11 may be formed by the following method. Before forming of the insulating portion 109, a resist of photoresist resin or the like is patterned at the predetermined position of the collector layer 4, and the resist is removed after the forming the insulating portion 109 to form the opening 11.

Then, connection terminal 12 is formed on a surface of the insulating portion 109 exposed through the opening 11 by applying of conductive adhesive, electroplating process, or non-electrolytic plating process.

The above processes provide the solid electrolytic capacitor of Embodiment 4. When reliability of connection with the external device as well as electrical performance is required to improve, the connection bump 13 may be preferably formed on the connection terminal 12.

The solid electrolytic capacitor of Embodiment 4 manufactured by such method may be directly connected to the external device and assure excellent characteristics at high frequencies. Further, the distance between an anode and a cathode, i.e., the distance between the valve metal sheet 1 and the solid electrolyte layer 3 can be short, thus reducing a reactance component of the capacitor of Embodiment 4.

What is claimed is:

1. A solid electrolytic capacitor comprising:

a valve metal sheet having a porous portion on a first surface thereof;

a dielectric layer provided on said porous portion;

a first insulating portion provided on an outer periphery of said dielectric layer;

a solid electrolyte layer provided on said dielectric layer;

a second insulating portion provided on an outer periphery of said solid electrolyte layer and on said first insulating portion; and a collector layer provided on said solid electrolyte layer.

2. The solid electrolytic capacitor of claim 1, wherein a recess is formed in an outer periphery of said valve metal sheet, and said first insulating portion is positioned over said recess.

3. The solid electrolytic capacitor of claim 1, further comprising:

a third insulating portion provided on a second surface of said valve metal sheet, said third insulating portion having an opening formed therein; and a connection terminal connected to said second surface of said valve metal sheet and provided in said opening of said third insulating portion.

4. The solid electrolytic capacitor of claim 3, further comprising a connection bump provided on said connection terminal.

5. The solid electrolytic capacitor of claim 3, further comprising:

a through-hole electrode connected to said collector layer, said through-hole electrode provided in a through-hole formed through said third insulating portion, said valve metal sheet, and said dielectric layer; and a fourth insulating portion provided in said through-hole, said fourth insulating portion being provided between said through-hole electrode and said valve metal sheet, said fourth insulating portion being provided between said through-hole electrode and said dielectric layer.

6. The solid electrolytic capacitor of claim 5, further comprising a connection bump provided on said through-hole electrode.

7. The solid electrolytic capacitor of claim 1, further comprising:

a third insulating portion provided on said collector layer, said third insulating portion having an opening formed therein; and a connection terminal connected to said collector layer and provided in said opening of said third insulating portion.

8. The solid electrolytic capacitor of claim 7, further comprising a connection bump provided on said connection terminal.

9. The solid electrolytic capacitor of claim 7, further comprising:

a via-hole electrode connected with said valve metal sheet and provided in a via-hole formed through said collector layer and said solid electrolyte layer; and a fourth insulating portion provided in said via-hole, said fourth insulating portion being provided between said via-hole electrode and said solid electrolyte layer said fourth insulating portion being provided between said via-hole electrode and said collector layer.

10. The solid electrolytic capacitor of claim 9, further comprising a connection bump provided on said via-hole electrode.

11. The solid electrolytic capacitor of claim 1, wherein said valve metal sheet includes aluminum.

12. The solid electrolytic capacitor of claim 1, wherein said valve metal sheet comprises:

a valve metal foil, and a body of sintered valve metal powder provided on said valve metal foil.

13. The solid electrolytic capacitor of claim 1, wherein said solid electrolyte layer includes pi-electron conjugated polymer.

14. The solid electrolytic capacitor of claim 1, wherein said solid electrolyte layer includes conductive polymer.

15. The solid electrolytic capacitor of claim 1, wherein said first insulating portion includes hydrophilic resin.

16. The solid electrolytic capacitor of claim 1, wherein said first insulating portion includes epoxy resin.

17. The solid electrolytic capacitor of claim 1, wherein said solid electrolyte layer extends to a portion between said first insulating portion and said second insulating portion.

18. A method of manufacturing a solid electrolytic capacitor, comprising the steps of:

providing a valve metal sheet having a porous portion on a first surface thereof;

forming a dielectric layer on the porous portion;

forming a first insulating portion on an outer periphery of the dielectric layer;

forming a solid electrolyte layer on the dielectric layer;

forming a second insulating portion on the first insulating portion and the the solid electrolyte layer, the second insulating portion having an opening formed therein that exposes a portion of the solid electrolyte layer; and forming a collector layer on the exposed portion of the solid electrolyte layer.

19. The method of claim 18, further comprising the step of forming a recess in an outer periphery of the first surface of the valve metal sheet, the first insulating layer being located over the recess.

20. The method of claim 19, wherein said step of forming the recess comprises the sub-step of forming the recess by at least one of a pressing process, grinding process, chemical etching process, and laser beam machining process.

21. The method of claim 18, further comprising the steps of:

forming a third insulating on a second surface of the valve metal sheet, the third insulating layer having an opening that exposes a portion of the second surface of the valve metal sheet; and forming a connection terminal in the opening of the third insulating layer, the connection terminal being connected to the second surface of the valve metal sheet.

22. The method of claim 21, farther comprising the step of forming a connection bump on the connection terminal.

23. The method of claim 21, further comprising the steps of:

forming a hole passing through the valve metal sheet and the dielectric layer;

forming a fourth insulating layer in the hole; and forming a through-hole electrode in the hole, the through-hole electrode being insulated from the valve metal sheet with the fourth insulating layer and connected with the collector layer.

24. The method of claim 23, further comprising the step of forming a connection bump on the through-hole electrode.

25. The method of claim 18, further comprising the steps of:

forming a third insulating layer on the collector layer, the third insulating layer having an opening that exposes a portion of the collector layer; and forming a connection terminal in the opening of the third insulating layer, the connection terminal being connected to the collector layer.

26. The method of claim 25, further comprising the step of forming a connection bump on the connection terminal.

27. The method of claim 25, further comprising the steps of:

forming a hole passing through the collector layer, the solid electrolyte layer, and the dielectric layer;

forming a fourth insulating layer in the hole; and forming a via-hole electrode in the hole, the via-hole being insulated from the collector layer and the solid electrolyte layer with the fourth insulating layer and connected with the valve metal sheet.

28. The method of claim 27, further comprising the step of forming a connection bump on the via-hole electrode.

29. The method of claim 18, wherein said step of forming the solid electrolyte layer comprises the sub-step of forming the solid electrolyte layer by at least one of chemical polymerization and electrolytic polymerization.

30. The method of claim 18, wherein said step of forming the solid electrolyte layer comprises the sub-steps of:

forming a conductive polymer layer by chemical polymerization on the portion of the dielectric layer exposed through the opening of the first insulating layer;

connecting a feed electrode to the conductive polymer layer; and forming another conductive polymer layer by electrolytic polymerization on the conductive polymer layer with use of the feed electrode.

31. The method of claim 18, wherein the solid electrolyte layer extends to a portion between the first insulating portion and the second insulating portion.

32. The method of claim 31, wherein said step of forming the solid electrolyte layer comprises the steps of:

forming a first conductive polymer layer by chemical polymerization on the dielectric layer and on the first insulating portion;

connecting a feed electrode to a portion of the first conductive polymer layer that is positioned on the first insulating portion; and forming a second conductive polymer layer by electrolytic polymerization on the first conductive polymer layer with use of the feed electrode.

33. The method of claim 18, wherein said step of forming the collector layer comprises the sub-step of forming the collector layer with fine carbon particle suspension and conductive adhesive.

34. The method of claim 18, wherein said step of forming the collector layer comprises the sub-step of forming the collector layer by evaporation or plating.

35. The method of claim 18, wherein said step of forming the first insulating portion comprises the sub-steps of:

applying insulating resin having a viscosity more than 1 Pa·s on the outer periphery of the valve metal sheet; and hardening the applied insulating resin.

36. The method of claim 18, wherein said step of forming the second insulating portion comprises the sub-steps of:

applying insulating resin having a viscosity more than 1 Pa·s on the first insulating portion and the solid electrolyte layer; and hardening the applied insulating resin.

37. The method of claim 18, wherein said step of forming the first insulating portion comprises the sub-step of forming the first insulating portion by a dispenser.

38. The method of claim 18, wherein said step of forming the second insulating portion comprises the sub-step of forming the second insulating portion by a dispenser.

* * * * *